(12) United States Patent
Lee

(10) Patent No.: US 6,900,727 B2
(45) Date of Patent: May 31, 2005

(54) WEAPON DETECTOR SYSTEM

(76) Inventor: Bert Taeho Lee, 214 Madison Ave., Cresskill, NJ (US) 07626

(*) Notice: Subject to any disclaimer, the term of this patent is extended or adjusted under 35 U.S.C. 154(b) by 0 days.

(21) Appl. No.: 10/269,732

(22) Filed: Oct. 10, 2002

(65) Prior Publication Data

US 2004/0012494 A1 Jan. 22, 2004

Related U.S. Application Data

(60) Provisional application No. 60/396,180, filed on Jul. 16, 2002.

(51) Int. Cl.[7] .............................................. G08B 13/24
(52) U.S. Cl. ........................ 340/551; 340/552; 324/558
(58) Field of Search ................................ 340/551, 552, 340/558, 568.1, 572, 673; 324/243, 558

(56) References Cited

U.S. PATENT DOCUMENTS

| | | | |
|---|---|---|---|
| 3,665,448 A | | 5/1972 | McGlinchey et al. |
| 3,758,849 A | * | 9/1973 | Susman et al. ............. 324/225 |
| 4,251,808 A | | 2/1981 | Lichtblau |
| 4,357,535 A | | 11/1982 | Haas |
| 4,656,954 A | | 4/1987 | Tonali |
| 4,870,391 A | | 9/1989 | Cooper |
| 5,039,981 A | | 8/1991 | Rodriguez |
| 5,121,103 A | | 6/1992 | Minasy et al. |
| 5,121,105 A | * | 6/1992 | Aittoniemi ................... 340/551 |
| 5,841,346 A | * | 11/1998 | Park ........................... 340/540 |
| 5,992,094 A | * | 11/1999 | Diaz .............................. 49/31 |
| 6,076,303 A | | 6/2000 | Orsini |
| 6,308,644 B1 | * | 10/2001 | Diaz ............................. 109/6 |
| 6,362,739 B1 | | 3/2002 | Burton |
| 6,366,203 B1 | | 4/2002 | Burns |
| 6,686,846 B1 | | 2/2004 | Lee |
| 2003/0137420 A1 | * | 7/2003 | Turner et al. ............ 340/572.1 |

* cited by examiner

*Primary Examiner*—Daniel Wu
*Assistant Examiner*—Samuel J. Walk
(74) *Attorney, Agent, or Firm*—Cantor Colburn LLP

(57) ABSTRACT

A weapon detector system including a detecting gate which is placed on the inside of an entrance; a central processing unit connected by wire with transmitter coils and receiver coils of the detecting gate; and an image receiving device, a warning indication lamp and a photographing device that are wirelessly controlled by the central processing unit; wherein the detecting gate includes side panels connected together, a first side panel containing the transmitter coils and a second side panel containing the receiver coils, the first and second side panels standing on opposite sides of the entrance facing each other, and the insulating material situated on a suitable position of a metallic frame surrounding the entrance for preventing a scattering and vortex phenomenon.

2 Claims, 2 Drawing Sheets

WEAPON DETECTOR SYSTEM

CROSS REFERENCE TO RELATED APPLICATIONS

This application claims the benefit of U.S. Provisional Patent Application Ser. No. 60/396,180, filed Jul. 16, 2002, the contents of which are incorporated by reference herein in their entirety.

FIELD OF THE INVENTION

The present invention relates to a weapon detector system for detecting all kinds of weapons such as a pistol. More precisely, the present invention relates to a weapon detector system, which may monitor any person carrying a weapon and inform such to a manager and/or a person observing with a warning indication lamp and/or a warning flare, when any person carrying a weapon passes through the entrance.

In addition, the weapon detector system according to the present invention give not an uncomfortable feeling to a general messenger while effectively preventing a weapon accident or mishap.

BACKGROUND OF THE INVENTION

Currently, the purchase of a weapon, such as firearms, is relatively free and legitimate; therefore various crime accidents are increasing. There have been such frequent criminal accidents caused by weapons in public places such as supermarkets, 24-hour convenience stores, liquor shops, schools, banks, airports and government offices.

Therefore, in such places, arch-shaped weapon detecting gates are placed on the inside of the entrance for detecting any person carrying a weapon among those who passes through the entrance, wherein the detecting gates are connected with a detecting system to indicate a person who carries a weapon.

According to a conventional weapon detector system, most of detector gates, which are placed on the inside of an entrance, comprise a pair of side panels and an arch-shaped or a straight upper panel, which connects the side panels to each other. These kinds of reverse U-shaped or latticed detecting gates are a strain to persons passing through the entrance. Further, ordinary persons who are passing through the conventional detecting gate feel like they are entering a tunnel, so it gives an unpleasant feeling and a hesitant feeling to them.

Furthermore, in a case where the entrance enclosed with a metallic frame will be closed, while the weapon-detecting gate was detecting whether a person has or does not have any weapons, there are frequent occasions when the detector system causes an erroneous operation by seriously scattering an electromagnetic field because the entrance operates with a massive metallic panel of one loop form.

By reason of such erroneous operation of the detecting system, it is impossible to detect any weapon accurately, and there is a possibility to mistakenly identify a person who does not have a weapon.

SUMMARY OF THE INVENTION

Nevertheless, one object of the present invention is to provide a weapon detector system that may not give an unpleasant experience.

According to the present invention, when any person carrying a weapon passes through an entrance, a weapon detector system of the present invention placed on the inside of the entrance monitors any person carrying a weapon and informs the results to a manager and/or to a person observing with a warning indication lamp and/or a warning flare, so that criminal accidents caused by weapons can be prevented.

Another objective of the present invention is to provide a weapon detector system which may be installed at the entrance to numerous sites, such as, and without any limitation, schools, supermarkets, 24 hour convenience stores, liquor shops, banks, government offices and the like in which the general public frequently visit as a part of daily life, while giving no psychological sense of oppression and no rejection feeling to persons passing through the entrance.

The other objective of the present invention is to provide a weapon detector system which monitors any person carrying a weapon passing through an entrance, and informs to a manager and/or to a person observing of the results with a warning indication lamp and/or a warning flare, so that criminal accidents caused by a weapon can be prevented.

In the context of the present invention, these objects can be achieved by the following construction. Namely, a weapon detector system according to the present invention comprises:

a detecting gate which is placed on the inside of an entrance;

a central processing unit connected by wire to transmitter coils and receiver coils of the detecting gate; and an image-receiving device, a warning indication lamp and a photographing device that are wirelessly controlled by the central processing unit, in characterized that the detecting gate comprises a pair of side panels, wherein one of said side panels contains the transmitter coils and the other side panel contains the receiver coils, the side panel containing the transmitter coils and the side panel containing the receiver coils stands on both sides of the passage to face each other, and an insulating material is situated in a suitable position of a metallic frame surrounding the entrance for the sake of preventing a scattering and vortex phenomenon of electromagnetic fields.

BRIEF DESCRIPTION OF THE DRAWINGS

Other characteristics, objects, and advantages of the present invention appear on reading the following detailed description and on looking at the accompanying drawings, which are given by way of non-limiting example and in which.

DETAILED DESCRIPTION OF THE PREFERRED EMBODIMENTS

Figure 1:
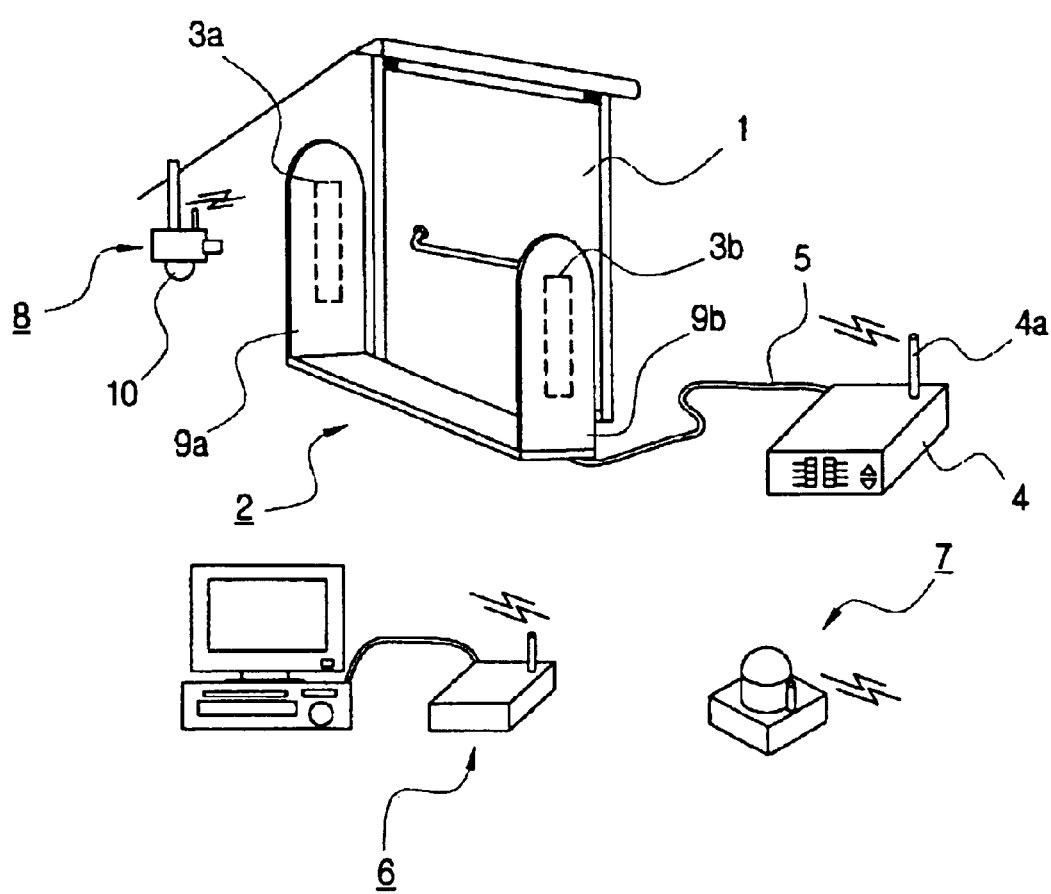
FIG. 1 is a schematic view of a weapon detector system suitable for installing on the inside of the entrance.

FIG. 1 is a schematic view of a weapon detector system suitable for installing on the inside of the entrance.

As shown in FIG. 1, the present invention mainly comprises a detecting gate 2 which is placed on the inside of the entrance 1, transmitter coils 3a and receiver coils 3b contained in the detecting gate 2 and connected with a center processing unit 4 by wire 5, and an image-receiving device 6, a warning indication lamp 7 and an photographing device 8 that are wirelessly controlled by the central processing unit 4.

As mentioned above, in the context of the present invention, the detecting gate 2 comprises only a pair of side panels 9a and 9b without an upper panel, wherein one of the side panel contains the transmitter coils 3a and the other side panel 9b contains the receiver coils 3b.

In addition, the side panel 9a containing the transmitter coils 3a and the side panel 9b containing the receiver coils 3b stands on both sides of the passage to face each other.

According to the first characteristic of the present invention, there is no the upper panel for connecting the side panels 9a and 9b of the detecting gate 2 to each other.

In addition, according to the second characteristic of the present invention, the insulating materials 11, which is made from plastic material, is situated in a suitable position of metallic frame 12 surrounding the entrance 1 to prevent a scattering and vortex phenomenon of the electromagnetic field by a signal transmitted from the transmitter coils 3a, when the entrance is closed.

Figure 2:
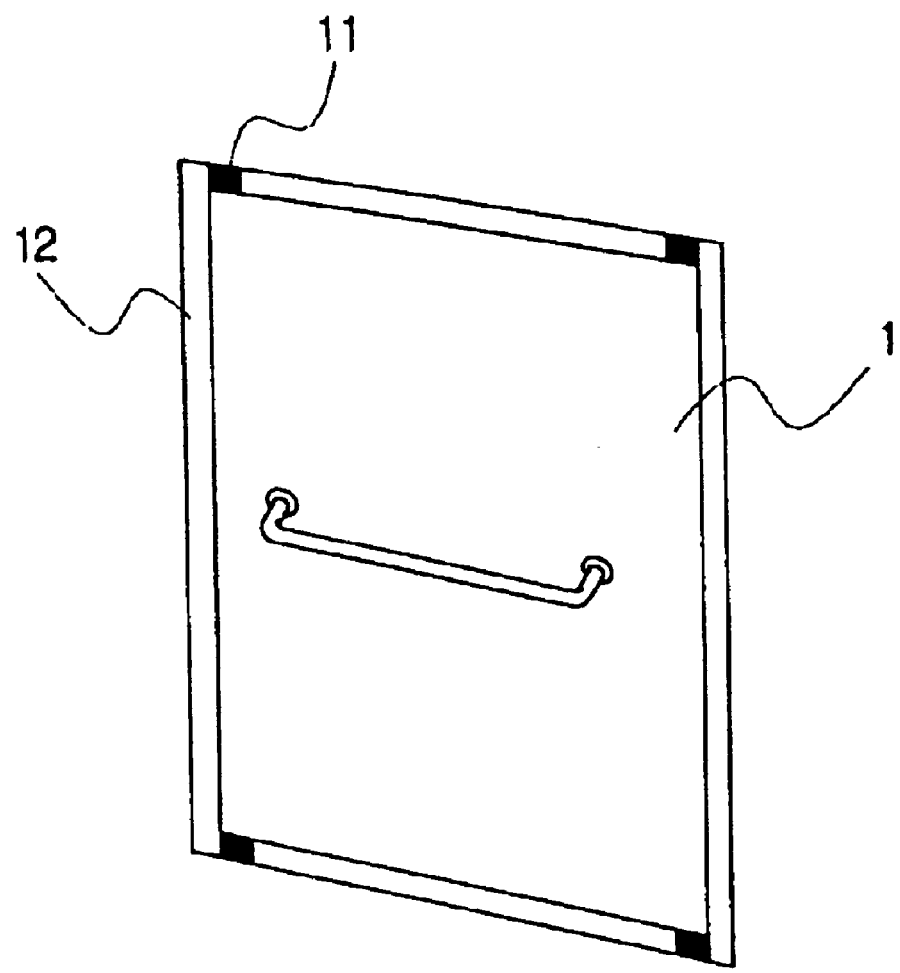
FIG. 2 is a schematic view of the entrance for showing the condition of the installation of insulating materials.

That is, as shown in FIG. 2, the insulating material 11 can be used in suitable position, preferably 4~8 positions, of metallic frame 12 surrounding the entrance 1, thereby the massive metallic frame 12 of one loop form may be split and divided into small metal units to minimize the size of the scattering of the electromagnetic field and prevent the erroneous operation of the weapon detector system.

When the weapon detector system is operated, the receiver coils 3b being contained in the side panel 9b receive the signals having a constant frequency band transmitted by the transmitter coils 3a which are contained in the side panel 9a.

In such operation condition, if any person carrying a weapon passes through the detector gate 2, some variations of the electromagnetic field will be generated in the signal received by the receiver coil 3b due to the weapon and then the central processing unit 4 may inspect the width of the scattered electromagnetic field variation, conduct a comparison and analysis between the width of variation and predetermined weapon data and detect the weapon on the basis of the comparison values.

Thereafter, the image signals photographed by the camera 8 is recorded on the PC monitor of the image-receiving device 6 by wireless, while the signals output therefrom operate the warning indication lamp 7 and the warning flare 10.

Therefore, the weapon detector system according to the present invention can film the weapon-carrying person's impression while getting dressed and inform to the manager and/or the person observing of such with the warning indication lamp 7 and/or the warning flare 10 simultaneously.

In particular, since the insulating material is situated in suitable position of the metallic frame surrounding the entrance, the weapon detector system according to the present invention can substantially be reduced and prevent a scattering and vortex phenomenon of the electromagnetic field, which may happen by closing of the entrance, while detecting whether a person has a weapon.

In addition, the detector system of the present invention can effectively prevent a weapon accident or mishap, while giving no psychological sense of oppression and no rejection feeling to persons passing through the entrance, because the erroneous operation of the detector system, which frequently happens in the conventional detector system, may be reduced and any person carrying a weapon has exactly been detected as well as not giving inaccurate identity to a person who does not have weapon, In conclusion, the weapon detector system of the present invention does not give coercive nor tense reaction, solves refusal persimmon by mental stress because a person only passes a pair of side panels when a general messenger is passing through the detector gate, senses only a person who has any weapons, and then informs the manager and/or the person observing of such so that any criminal accidents caused by weapons can prevent an affair from arising.

If necessary, the weapon detector system according to the present invention can be connected with an existing external security system of an expert security providing company.

Naturally, the present invention is not limited to the particular embodiment described above, but extends to any variants coming within its spirit.

What is claimed is:

1. A weapon detector system that does not give an uncomfortable feeling to a general messenger passing through an entrance, comprising:

a detecting gate placed on an inside of the entrance;

a central processing unit connected by wire to transmitter coils and receiver coils of the detecting gate; and an image receiving device, a warming indication lamp and a photographing device that are wirelessly controlled by the central processing unit;

wherein the detecting gate comprises a pair of side panels including a first side panel containing the transmitter coils and a second side panel containing the receiver coils, the first and second side panels standing on opposite sides of the passage facing each other, the first side panel including a first upper end and the second side panel including a second upper end, the first and second upper ends extending freely, not connected to one another;

wherein an insulating material is situated on a suitable position of a metallic frame surrounding the entrance for preventing a scattering and vortex phenomenon of an electromagnetic field caused by the metallic frame, when the entrance is closed.

2. A detector system according to claim 1 wherein the insulating material is situated on 4–8 places of the metallic frame surrounding the entrance.

* * * * *